June 17, 1930.  W. C. TODD  1,764,910
SPRINKLER
Filed Feb. 16, 1929
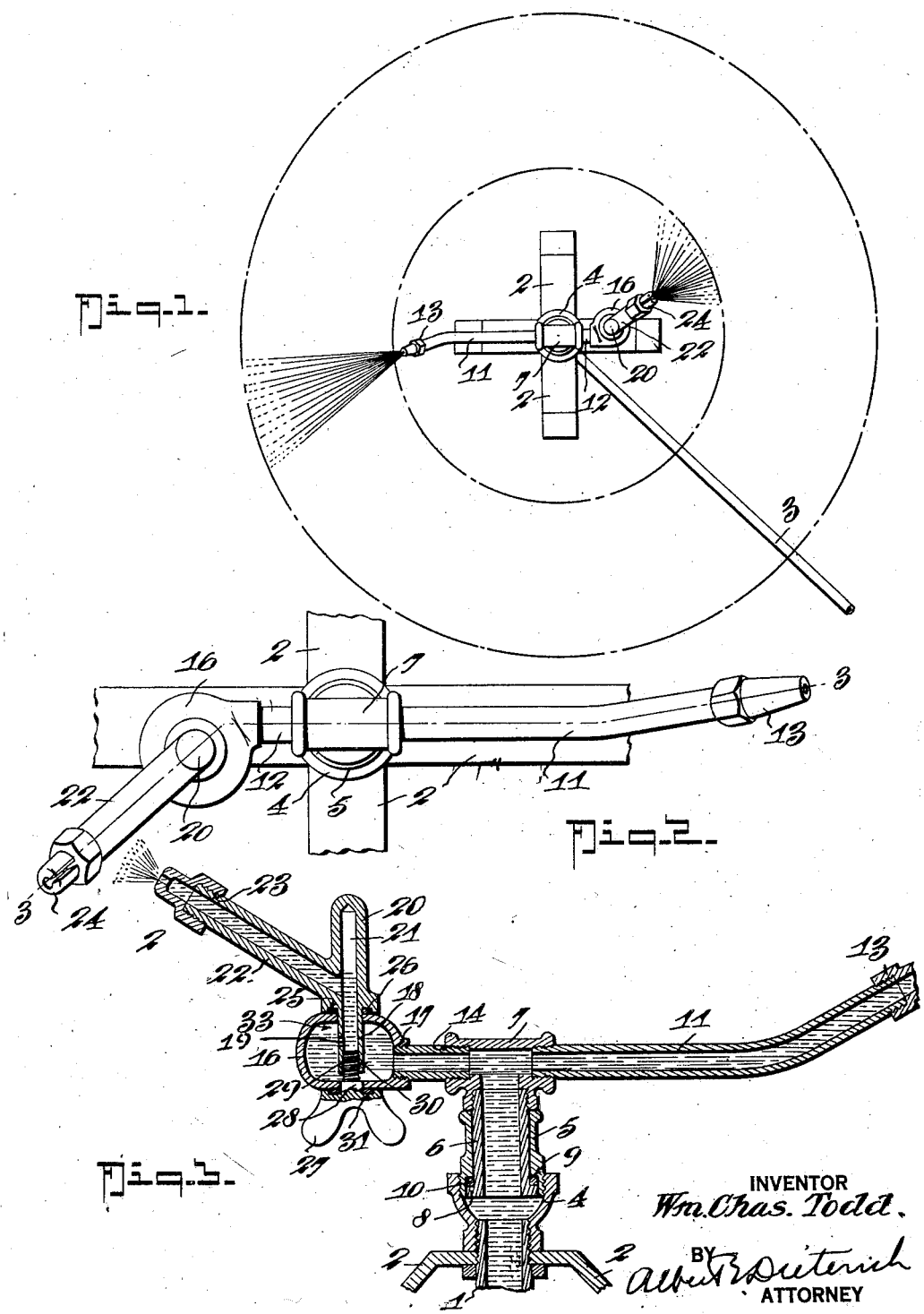
INVENTOR
Wm. Chas. Todd
BY
Albert F Dieterich
ATTORNEY Patented June 17, 1930

1,764,910

UNITED STATES PATENT OFFICE

WILLIAM CHARLES TODD, OF VICTORIA, BRITISH COLUMBIA, CANADA, ASSIGNOR TO ECONOMY IRRIGATION COMPANY, INC., OF SEATTLE, WASHINGTON, A CORPORATION OF WASHINGTON

SPRINKLER

Application filed February 16, 1929. Serial No. 340,507.

The invention relates to the art of water sprinklers and especially to lawn sprinklers of the general type disclosed in Letters Patent No. 1,639,389, issued August 16, 1927.

The present invention has for its object to provide certain new and useful improvements in the type of sprinkler referred to which will overcome certain deficiencies found in those sprinklers now in use and thereby increase the efficiency and enable a greater distance to be covered by the water thrown by the inner or control sprinkler after it passes through the control nozzle.

Further, it is an object to provide a control nozzle unit for lawn sprinklers of the type disclosed in the Letters Patent aforesaid, which will have provisions for maintaining a steady stream of uniform velocity through the control nozzle even though there be slight variations in the water pressure in the supply hose due to the turning on and off of other water outlets in the immediate neighborhood.

Again it is an object to provide a control nozzle for water sprinklers of the type disclosed in the Letters Patent aforesaid, with means by which the position of the control nozzle arm may be changed easily and quickly to govern the speed of rotation of the sprinkler and without the aid of tools.

Further, an object is to provide a positive means to prevent leakage between the balancing bulb and the control nozzle, thereby obtaining a water and air-tight joint and thus enabling the center of the bulb to be located above the water inlet instead of below the same as in the Letters Patent aforesaid to enable an air trap or pocket to be formed above the water opening into the hollow stem of the control nozzle and to provide thereby a pressure equalizing cushion within the bulb.

Further, it is an object to provide the nozzle stem with a chamber to trap air as a cushion above where the stem delivers the water to the nozzle duct which aids in maintaining a steady pressure on the water as it issues from the nozzle even though there be slight pressure variations at the inlet to the water bulb; this insures the sprinkling of the full area within the circular area covered by the longer distance nozzle.

Further, it is an object to provide an air cushion in the control nozzle stem for the water to force itself against before going out through the nozzle duct and nozzle tip, so as to decrease the friction at the place where the water stream bends from a straight upward direction to a lateral direction in entering the nozzle duct.

Further, it is an object to provide means whereby a more perfect break of the water after it leaves the nozzle is obtained than is possible by the use of the control head of the Letters Patent aforesaid.

Other objects will in part be obvious and in part be pointed out hereinafter.

To the attainment of the aforesaid objects and ends, my invention consists in the novel features of construction and in the combination, connection and arrangement of parts, hereinafter more fully described and then pointed out in the appended claims.

In the drawing:

Figure 1 is a plan view of a sprinkler embodying the invention.

Figure 2 is an enlarged detail plan view of a portion thereof.

Figure 3 is a central vertical longitudinal section on the line 3—3 of Figure 2.

In the drawing in which like numerals of reference indicate like parts in all of the figures, 1 is the stand pipe which is mounted on a suitable base 2 and to which the water is supplied by a hose connection 3 from a suitable source of water supply. The stand pipe 1 carries a nipple 4 having a tubular bearing portion 5 rotatably to receive the hollow stem 6, upon the upper end of which the cross coupling or T head 7 is secured.

At the lower end the stem 6 is provided with a bearing flange 8 which is rotatable in the shouldered bearing 9 provided therefor in the lower end of the nipple 4, a suitable bearing washer 10 being interposed between the thrust or bearing surfaces to reduce friction and to provide for greater evenness of rotation and quietness of operation of the rotatable head.

Long and short arms 11 and 12 respectively are secured in the open ends of the T head 7 and the said long arm is turned slightly upwardly and laterally and is equipped at its end with a nozzle 13 hereinafter termed the main nozzle and which, when the device is in operation, is adapted to serve the outermost concentric area indicated between the dot and dash circles in Figure 1 of the drawing, and because of its slight lateral position serves to impart rotation to the sprinkler head in direction according to the direction of such lateral projection. The direction of rotation will, of course, be opposite that to which the said nozzle is projected.

All of the foregoing parts may be of the same construction as that disclosed in the patent aforesaid.

Projecting oppositely to the arm 11 is a short arm 12 having one end 14 threaded into the head 7 and having its other end threaded into the eccentric inlet 17 of the bulbous body 16. The bulbous body 16 in the present invention is so designed that its center lies above the inlet 17 instead of below the same as in the patent aforesaid.

The bulbous body 16 is hollow so as to provide an enlarged water chamber to contain a sufficient volume of water for balancing purposes as in the patent aforesaid. The bulbous body is drilled through on a vertical axis to receive a hollow stem 18 having a water inlet aperture 19 on the side opposite the inlet 17. Above the hollow stem 18 is a head 20 in which is located a compression chamber 21 formed as a continuation of the bore of the stem 18, and projected laterally and upwardly from the head 20 is a nozzle duct 22, the opening through which communicates with the bore of the hollow stem 18 at a point below the compression chamber 21. The outer end of the nozzle duct 22 is threaded at 23 to receive the usual nozzle tip 24.

25 designates a recess in the head 20 to receive a washer 26 of leather, rubber, fibre or other suitable material to effect an air and water-tight seal between the bulb 16 and the head at the place where the stem 18 passes into the bulb's chamber.

27 is a winged nut having a circular stem portion 28 to fit the lower opening in the bulb 16 and having a threaded stem portion 29 to screw into the threaded end 30 of the hollow stem 18 and thus secure the parts together. The winged nut 27 has a recess 31 to receive a sealing washer of leather, rubber, fibre or other suitable material.

It will be seen by reference to the drawing that the opening 19 into the hollow stem 18 is located on the side of the stem away from the inlet 17 and there is but a single opening 19 provided. Furthermore, this opening 19 is located below the top of the bulb 16 so as to provide an air-pocketing space 33 in the bulb 16 and preferably located at a point just above the inlet 17. The provision of the air-pocketing spaces 33 and 21 serves to equalize the pressure of the water stream as it issues from the nozzle tip 24 since the air in the spaces 33 and 21 when the water is turned on will compress and serve as elastic cushions to take up the fluctuations in the water pressure.

Experience has shown that the nozzle duct 22 performs its most efficient function when it is about two inches in length between the head 20 and the nozzle tip 24.

Furthermore, by providing the air cushion 21 in the head 20 the water flowing upwardly through the stem does not strike a rigid abutment before it is deflected into the nozzle duct and thus friction at this place is decreased. Experience has shown that with the present construction as compared with the construction disclosed in the patent aforesaid, about two feet greater distance in the water throw is obtained by the present structure over what is obtained by the structure disclosed in said Letters Patent.

The complete machine in operation under a pressure of about seventy pounds, covers a circle with the long arm of about one hundred and fifteen feet, and as the water is distributed from that arm it breaks and covers back to a distance of seventy-five feet from the stand, but from that point, with the structure shown in the patent aforesaid, experience has shown that the water was not carried far enough so that the break from the control nozzle did not meet the break of the water up to seventy-five feet and a dry ring showed up. But with the present invention employed it has been found that this dry area has been eliminated. By placing a series of testing cups a foot apart from the stand outwardly it has been found that by the use of the present invention all of the cups were evenly filled after a run of a given time and the ground to be watered was watered perfectly.

Another feature of the present construction is the use of but one hole 19 for the water to get up to and pass through the control nozzle. In order to obtain the proper effect it has been found that the ideal place for the hole 19 is on the same side as that of the nozzle duct, i. e., the side opposite to the inlet 17. Having the hole 19 located on the front and providing the air cushion chamber 20 a most perfect break of the water at the nozzle tip 24 is obtained.

From the foregoing description, taken in connection with the accompanying drawing, it is thought the construction, operation and advantages of my invention will be clear to those skilled in the art to which it relates.

What I claim is:

1. In sprinklers wherein is provided a stand pipe, a rotatable coupling mounted on the stand pipe, an arm secured to said coupling and having a reaction nozzle to impart rotation to the coupling; a control arm unit comprising a second arm secured to said coupling, a hollow balancing body having an inlet eccentric to the axis of said body and having an axial bore through the same, said balancing body being mounted on said second arm, a control nozzle comprising a chambered head, a hollow nozzle duct extending laterally from said head below the chamber thereof and a hollow stem projecting from said head into said balancing body, means passing into said balancing body and secured to said stem for holding the same in place, means to effect air and water-tight joints between said hollow body and said stem and between said hollow body and said securing means, said hollow stem having a water inlet, substantially as shown and described.

2. In sprinklers wherein is provided a stand pipe, a rotatable coupling mounted on the stand pipe, an arm secured to said coupling and having a reaction nozzle to impart rotation to the coupling; a control arm unit comprising a second arm secured to said coupling, a hollow balancing body having an inlet eccentric to the axis of said body and having an axial bore through the same, said balancing body being mounted on said second arm, a control nozzle comprising a chambered head, a hollow nozzle duct extending laterally from said head below the chamber thereof and a hollow stem projecting from said head into said balancing body, means passing into said balancing body and secured to said stem for holding the same in place, means to effect air and water-tight joints between said hollow body and said stem and between said hollow body and said securing means, said hollow stem having a water inlet located at a place below the top of said hollow body and above the inlet thereof for the purposes specified.

3. In sprinklers wherein is provided a stand pipe, a rotatable coupling mounted on the stand pipe, an arm secured to said coupling and having a reaction nozzle to impart rotation to the coupling; a control arm unit comprising a second arm secured to said coupling, a hollow balancing body having an inlet eccentric to the axis of said body and having an axial bore through the same, said balancing body being mounted on said second arm, a control nozzle comprising a head, a hollow nozzle duct extending laterally from said head and a hollow stem projecting from said head into said balancing body, means passing into said balancing body and secured to said stem for holding the same in place, means to effect air and water-tight joints between said hollow body and said stem and between said hollow body and said securing means, said hollow stem having a water inlet, said head having a chamber to trap air as a cushion.

4. In sprinklers wherein is provided a stand pipe, a rotatable coupling mounted on the stand pipe, an arm secured to said coupling and having a reaction nozzle to impart rotation to the coupling; a control arm unit comprising a second arm secured to said coupling, a hollow balancing body having an inlet eccentric to the axis of said body and having an axial bore through the same, said balancing body being mounted on said second arm, a control nozzle comprising a head, a hollow nozzle duct extending laterally from said head and a hollow stem projecting from said head into said balancing body, means passing into said balancing body and secured to said stem for holding the same in place, means to effect air and water-tight joints between said hollow body and said stem and between said hollow body and said securing means, said hollow stem having a water inlet located at a place below the top of said hollow body and above the inlet thereof, said head having a chamber to trap air as a cushion.

5. In sprinklers of the type wherein is provided a stand pipe, a cross coupling rotatably mounted on the stand pipe, a long tubular arm secured to the coupling, a short tubular arm secured to the coupling; a main reaction nozzle secured to the long arm and directed angularly laterally thereof; a hollow balancing body on the end of the short arm and having a vertical bore therethrough, a control nozzle comprising a head, a hollow angularly directed nozzle duct extending laterally from the head, said head having a hollow vertical stem, said head having an air pocket above the place where the nozzle duct joins the head, and means adjustably to secure the vertical stem in said bore against leakage and to vary the angular projection of the control nozzle relatively to said short arm.

6. In sprinklers of the type wherein is provided a stand pipe, a cross coupling rotatably mounted on the stand pipe, a long tubular arm secured to the coupling, a short tubular arm secured to the coupling; a main reaction nozzle secured to the long arm and directed angularly laterally thereof; a hollow balancing body on the end of the short arm and having a vertical bore therethrough, a control nozzle comprising a head, a hollow angularly directed nozzle duct extending laterally from the head, said head having a hollow vertical stem, said head having an air pocket above the place where the nozzle duct joins the head, and means adjustably to secure the vertical stem in said bore against leakage and to vary the angular projection of the control nozzle relatively to said short arm, said hollow vertical stem having an aperture communicating with the interior of the hollow body at a point above the place where the water enters the hollow body from said short arm.

7. In sprinklers of the type wherein is provided a stand pipe, a cross coupling rotatably mounted on the stand pipe, a long tubular arm secured to the coupling, a short tubular arm secured to the coupling; a main reaction nozzle secured to the long arm and directed angularly laterally thereof; a hollow balancing body on the end of the short arm and having a vertical bore therethrough, a control nozzle comprising a head, a hollow angularly directed nozzle duct extending laterally from the head, said head having a hollow vertical stem, said head having an air pocket above the place where the nozzle duct joins the head, and means adjustably to secure the vertical stem in said bore against leakage and to vary the angular projection of the control nozzle relatively to said short arm, said hollow body being positioned with its center above and to one side of the path of travel of water through the small arm and to the side opposite the direction of projection of the main nozzle.

8. In sprinklers of the type stated, a stand pipe, a cross coupling rotatably mounted on the stand pipe, a long tubular arm secured to the coupling, a short tubular arm secured to the coupling, a main reaction nozzle secured to the long arm and directed angularly laterally thereof, a hollow balancing body on the end of said short arm having a vertical bore therethrough, a control nozzle including a hollow angularly directed nozzle duct and a hollow vertical stem, means adjustably to secure the vertical stem in said bore against leakage and to vary the angular projection of the nozzle relatively to said short arm, and an air cushioning means within said control nozzle for the purposes specified.

9. In sprinklers of the type stated, a stand pipe, a cross coupling rotatably mounted on the stand pipe, a long tubular arm secured to the coupling, a short tubular arm secured to the coupling, a main reaction nozzle secured to the long arm and directed angularly laterally thereof, a hollow balancing body on the end of said short arm having a vertical bore therethrough, a control nozzle including a hollow angularly directed nozzle duct and a hollow vertical stem extending above and below said angularly directed duct and closed at the upper end and communicating with said hollow body within the same, means adjustably to secure the vertical stem in said bore against leakage and to vary the angular projection of the nozzle relatively to said short arm within said hollow balancing body for the purposes specified.

10. In sprinklers of the type stated, a stand pipe, a cross coupling rotatably mounted on the stand pipe, a long tubular arm secured to the coupling, a short tubular arm secured to the coupling, a main reaction nozzle secured to the long arm and directed angularly laterally thereof, a hollow balancing body on the end of said short arm having a vertical bore therethrough, a control nozzle including a hollow angularly directed nozzle duct and a hollow vertical stem, means adjustably to secure the vertical stem in said bore against leakage and to vary the angular projection of the nozzle relatively to said short arm, an air cushioning means within said control nozzle, and an air cushioning means within said hollow balancing body for the purposes specified.

WILLIAM CHARLES TODD.